E. G. BUSSE.
CAR TRUCK CONSTRUCTION.
APPLICATION FILED MAR. 20, 1916.
1,182,455.
Patented May 9, 1916.
2 SHEETS—SHEET 1.
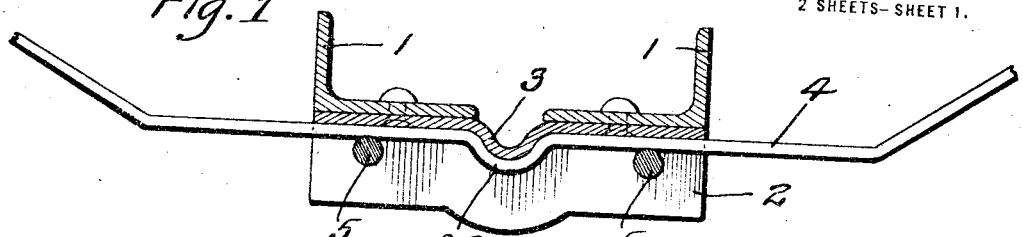
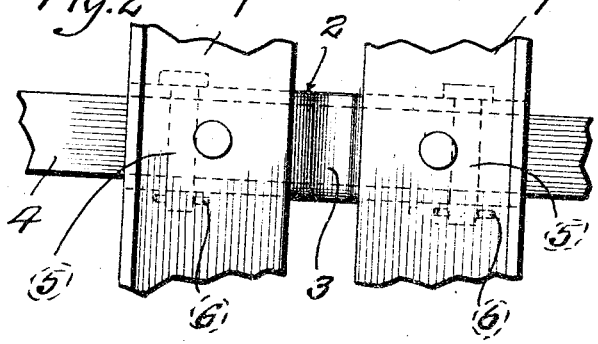
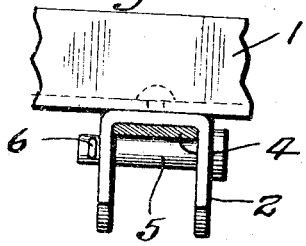
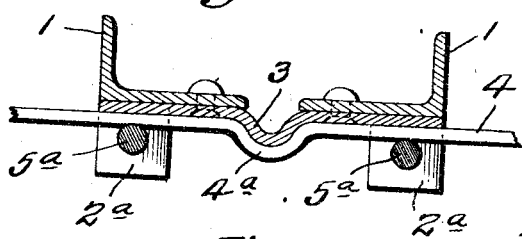
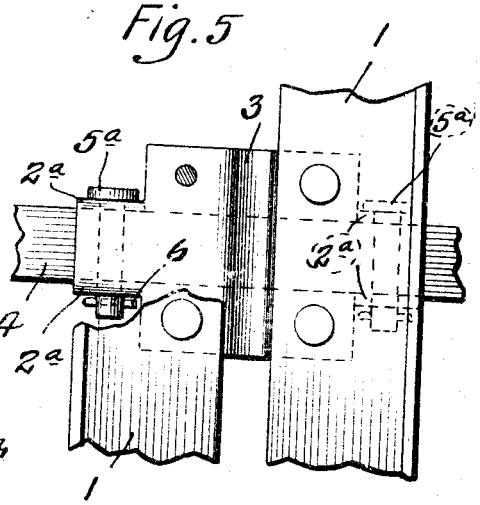
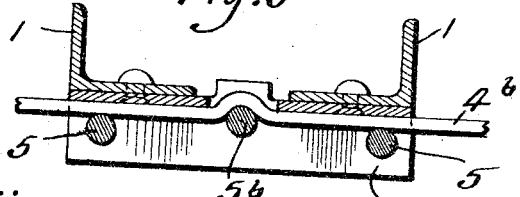
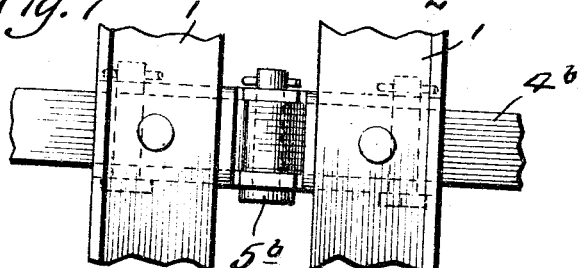
Inventor
Edwin G. Busse
By [signature], Atty.

E. G. BUSSE.
CAR TRUCK CONSTRUCTION.
APPLICATION FILED MAR. 20, 1916.
1,182,455.
Patented May 9, 1916.
2 SHEETS—SHEET 2.
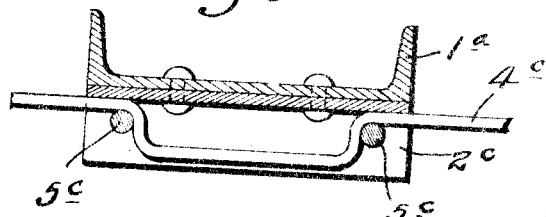
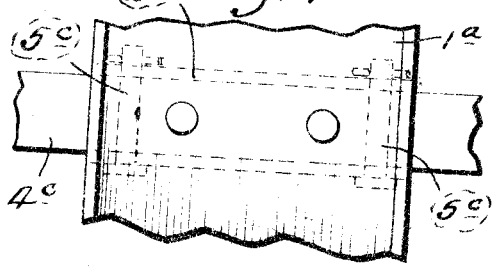
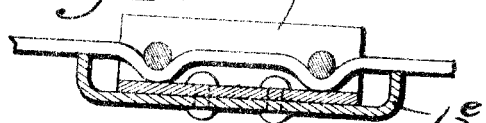
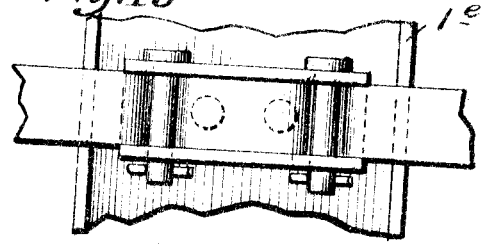
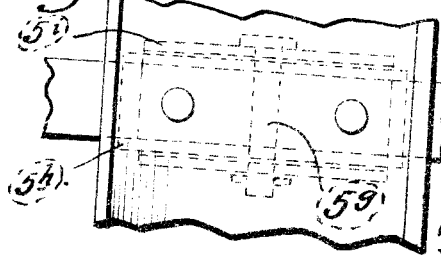
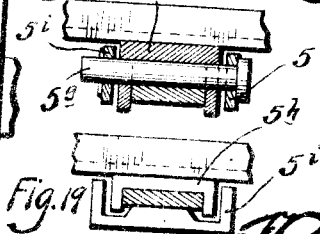
Inventor
E. G. Busse
By Cornwall Atty.

UNITED STATES PATENT OFFICE.

EDWIN G. BUSSE, OF CHICAGO, ILLINOIS, ASSIGNOR TO CHICAGO RAILWAY EQUIPMENT COMPANY, OF CHICAGO, ILLINOIS, A CORPORATION OF ILLINOIS.

CAR-TRUCK CONSTRUCTION.

1,182,455.

Specification of Letters Patent. Patented May 9, 1916.

Application filed March 20, 1916. Serial No. 85,337.

*To all whom it may concern:*

Be it known that I, EDWIN G. BUSSE, a citizen of the United States, residing at Chicago, Illinois, have invented a certain new and useful Improvement in Car-Truck Construction, of which the following is a full, clear, and exact description, such as will enable others skilled in the art to which it appertains to make and use the same, reference being had to the accompanying drawings, forming part of this specification, in which—

Figure 1 is a side elevational view partly in section of my improved car truck construction. Fig. 2 is a detail plan view of the structure shown in Fig. 1. Fig. 3 is an end elevational view of the structure shown in Fig. 1. Figs. 4 to 19 are side elevational views and plan views of modified forms of my invention which will hereinafter be more specifically described.

This invention relates to an improvement in car trucks and specifically to the inclined track supports of third and fourth point suspensions or supports for brake beams. Due to the location of the third and fourth point springs, as they are frequently called, (meaning the inclined supporting tracks), repair men frequently bend the supporting springs downward, out of proper alinement, in the unhanging of the beam, and as the springs are not of the best spring steel, they become inoperative when the beams are reapplied.

In the Williams Patents No. 1,080,741 and No. 1,126,328, there are shown several methods whereby the springs can be removed before the beams are taken down; but in most cases it is necessary to unscrew nuts from bolts, which should have been locked, and repair men will not usually go to so much trouble.

My present invention contemplates a simple form of mounting attached to a part of the truck, usually the spring plank in which the third or fourth point supporting spring is held from longitudinal movement by an abrupt depression in the mounting and spring, or in the spring alone, and from vertical displacement by removable pins. These pins are held in place by cotter pins, or some other means for preventing their accidental displacement but permitting their ready removal. The abrupt shoulders in the springs engaging either the abrupt shoulders in the mounting, or the pins, permit of very little longitudinal lost motion.

In the construction shown in the drawings, it is obvious that a brake beam may be quickly and readily removed from the truck for purposes of repair.

In the drawings in Figs. 1 to 5 inclusive, 1 indicates the members of the spring plank of a truck in the form of angle irons, but it is obvious that any form of spring plank, such as a channel or pressed steel, or wood, etc., may constitute part of the truck upon which the third or fourth point spring tracks are to be mounted.

Referring now to Figs. 1, 2, and 3, 2 is an inverted U-shaped mounting preferably in the form of a casting or forging which is secured to the underside of the angle irons 1 preferably by means of rivets, as shown, and which is formed with a jog or depression 3 whose shoulders, while not vertical, are preferably abrupt, although it is obvious that vertically disposed shoulders could be employed.

4 is the third or fourth point supporting track whose ends are preferably inclined upwardly and outwardly as usual, as shown in Fig. 1. The depending flanges of the mounting 2 are provided with openings through which pass pins 5. These pins preferably have heads at one end and are provided with openings through their opposite ends for the reception of cotter pins 6. Other forms of quickly and readily removable fastening devices may be employed to hold the pins 5 against accidental displacement.

The track 4 is provided with a jog or bend 4ª so formed as to engage the abrupt shoulders of the jog or depression 3. When the pins 5 are in position, the track is prevented from longitudinal movement incident to the engagement of its abrupt shoulders with the abrupt shoulders of the depression 3, and is prevented from lateral displacement by the depending walls of the mounting 2, being supported in place by the pins 5. These pins 5 offer means for enabling the quick and easy removal of the track 4 when it is necessary to unhang or repair the brake beams.

In Figs. 4 and 5 I have shown a pressed metal structure in which the pins 5ª are supported by the depending lugs or ears 2ª of a pressed metal plate.

In Figs. 6 and 7 I have shown a structure in which the track 4ᵇ is bent upwardly through an opening in the top wall of the mounting 2, between the angle irons 1, and while the abrupt shoulders may be held in position, by the two outside pins, to engage the edges of the opening into which this track plate jog or bend extends, I prefer to hold the same in position therein by means of a third pin 5ᵇ fitting within the cavity of the jog or bend which further tends to limit the longitudinal movement of the track plate.

In Figs. 8 and 9, I have shown the spring plank as being composed of a channel 1ᵃ, instead of two angle irons, and with a pressed steel or forged mounting 2ᶜ similar to that shown in Fig. 1, but having no means in its top wall to engage the track plate. The shoulders in the track plate are spaced far apart and are located in such position that they engage two pins 5ᶜ and in this manner prevent longitudinal displacement of the track plate.

In Figs. 10 and 11 I have shown the track plate 4ᵈ as being mounted above the channel shaped spring plank 1ᵈ and mounting 2ᵈ arranged on top of the spring plank, with removable pins therein, this arrangement being substantially the same as that shown in Figs. 8 and 9, but reversed.

In Figs. 12 and 13 I have shown a pressed steel spring plank 1ᵉ which, in substantial particulars, is like that shown in Figs. 10 and 11, except that the track plate is bent upwardly between the pins to clear the rivet heads which secure the mounting to the spring plank.

In Figs. 14 and 15, I have shown a pressed steel spring plank 1ᶠ having a forging or casting 2ᶠ, the parts being so constructed that only one removable pin 5ᶠ is used, this form being substantially the same as that shown in Fig. 1, but reversed.

In Figs. 16 and 17, 18 and 19, I have shown the construction in which there is a two-part mounting, and a single pin 5ᵍ. One part of the mounting 5ʰ is secured to the spring plank and is provided with depending lugs at its center through which the pin 5ᵍ passes, as shown in Fig. 18. The other part 5ⁱ of the mounting has its ends in direct engagement with the track plate there being a space at the center to accommodate the jog or bend in said track plate. The pin 5ᵍ passes through the jog or bend to engage the abrupt shoulders formed therein and by also passing through the side walls of the two parts of the mounting serves to hold the lower portion of the mounting in position.

There may be other forms in which tracks for third and fourth point brake beam supports may be mounted in position, and there may be other forms in which removable tracks for third and fourth point supports for brake beams having abrupt shoulders may be mounted in position wherein the track supporting elements are quickly and easily accessible, and therefore I do not wish to limit my invention to the specific forms shown.

I claim:

1. The combination of a part of a car truck, a track for coöperating with the third or fourth point supports of a brake beam, said track being formed with abrupt shoulders in its length, a mounting for said track having shoulders for engaging with the shoulders of the track to prevent longitudinal movement of the track, a removable pin or pins for holding the track in position so that its shoulders will engage those of the mounting and prevent its vertical displacement, there being means on said mounting for preventing its lateral displacement.

2. The combination of a part of a truck, a mounting for a track plate for third or fourth point supports of a brake beam secured to said part of the car truck, said track plate having abrupt shoulders formed in its length and removable pins arranged in the mounting for engaging said shoulders to prevent displacement of the track.

3. The combination of a part of a car truck, a two part mounting secured thereto for supporting in position the track plate of the third or fourth point support for brake beams, said two part mounting having one portion secured to a part of the truck, the other portion of said mounting being held in position by a cross pin carried by the portion of the mounting secured to the car truck, there being abrupt shoulders formed in the track plate for engagement with a part or parts of the mounting whereby displacement of said track plate is prevented.

In testimony whereof I hereunto affix my signature in the presence of two witnesses, this sixteenth day of March, 1916.

EDWIN G. BUSSE.

Witnesses:
 E. T. WALKER,
 R. S. DEACON.